United States Patent
Falk

(10) Patent No.: US 11,882,447 B2
(45) Date of Patent: Jan. 23, 2024

(54) COMPUTER-IMPLEMENTED METHOD AND NETWORK ACCESS SERVER FOR CONNECTING A NETWORK COMPONENT TO A NETWORK WITH AN EXTENDED NETWORK ACCESS IDENTIFIER

(71) Applicant: SIEMENS AKTIENGESELLSCHAFT, Munich (DE)

(72) Inventor: Rainer Falk, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 386 days.

(21) Appl. No.: 17/266,905

(22) PCT Filed: Aug. 2, 2019

(86) PCT No.: PCT/EP2019/070858
§ 371 (c)(1),
(2) Date: Feb. 8, 2021

(87) PCT Pub. No.: WO2020/030540
PCT Pub. Date: Feb. 13, 2020

(65) Prior Publication Data
US 2021/0321256 A1 Oct. 14, 2021

(30) Foreign Application Priority Data

Aug. 9, 2018 (EP) .................................. 18188314
Aug. 10, 2018 (EP) .................................. 18188525

(51) Int. Cl.
*H04W 12/08* (2021.01)
*H04L 9/40* (2022.01)
(Continued)

(52) U.S. Cl.
CPC ........... *H04W 12/08* (2013.01); *H04L 63/102* (2013.01); *H04W 8/18* (2013.01); *H04W 12/06* (2013.01); *H04W 48/02* (2013.01)

(58) Field of Classification Search
CPC ........... H04L 63/08; H04L 63/10–102; H04W 8/18–245; H04W 12/06–088;
(Continued)

(56) References Cited

U.S. PATENT DOCUMENTS 8,300,811 B2  10/2012  Georgiades
8,531,247 B2   9/2013  Dichtl
(Continued)

FOREIGN PATENT DOCUMENTS

CA   3019903 A1  10/2017
CN   1711785 A   12/2005
(Continued)

OTHER PUBLICATIONS

Cambridge Dictionary for the meaning of "when", printed on Jul. 18, 2023. (Year: 2023).*
(Continued)

*Primary Examiner* — Ronald Eisner
(74) *Attorney, Agent, or Firm* — Lempia Summerfield Katz LLC

(57) ABSTRACT

The invention relates to a computer-implemented method for connecting a network component to a network, in particular a mobile communications network, with an extended network access identifier. The method involves a receiving of the extended network access identifier from the network component via a network access server, wherein the extended network access identifier comprises at least one network access restriction for connecting the network component to the network. The method also involves a receiving of a requested user access profile from a user profile server (Continued)

via the network access server, wherein the user access profile comprises access authorisations for connecting the network component to the network. The network component is authenticated in the network via the network access server, if the received extended network access identifier fulfills thre access authorisations of the received user access profile. Then the network connection of the network component to the network via the network access server is configured by means of the access authorisations of the user access profile once the network component is authenticated. There is also a determining of the network restriction received with the extended network access identifier via the network access server, and a verifying of the configured network connection of the network component to the network via the network access server based on the determined network access restriction. Then the network component is connected to the network via the network access server, once the configured network connection is verified and the configured network connection fulfills the determined network access restrictions.

19 Claims, 4 Drawing Sheets

(51) Int. Cl.
H04W 8/18 (2009.01)
H04W 12/06 (2021.01)
H04W 48/02 (2009.01)

(58) Field of Classification Search
CPC ........... H04W 48/02; H04W 48/18–20; H04W 76/10–11
See application file for complete search history.

(56) References Cited

U.S. PATENT DOCUMENTS

| | | | |
|---|---|---|---|
| 8,843,761 B2 | 9/2014 | Meyer | |
| 8,892,616 B2 | 11/2014 | Dichtl | |
| 9,147,088 B2 | 9/2015 | Falk | |
| 9,584,311 B2 | 2/2017 | Meyer | |
| 2005/0078824 A1 | 4/2005 | Malinen et al. | |
| 2006/0013157 A1 | 1/2006 | Annic | |
| 2013/0156180 A1 | 6/2013 | Hess | |
| 2014/0335831 A1 | 11/2014 | Lamberton et al. | |
| 2015/0180654 A1 | 6/2015 | Falk | |
| 2015/0215128 A1* | 7/2015 | Pal | H04L 63/0815 713/155 |
| 2015/0264080 A1 | 9/2015 | Busser | |
| 2015/0293748 A1 | 10/2015 | Falk | |
| 2015/0318999 A1 | 11/2015 | Falk | |
| 2015/0334096 A1 | 11/2015 | Pyka | |
| 2015/0341343 A1 | 11/2015 | Dichtl | |
| 2015/0381307 A1 | 12/2015 | Falk | |
| 2015/0381308 A1 | 12/2015 | Falk | |
| 2016/0253438 A1 | 9/2016 | Böffgen | |
| 2016/0371510 A1 | 12/2016 | Falk | |
| 2017/0033931 A1 | 2/2017 | Fries | |
| 2017/0055164 A1 | 2/2017 | Santhanam et al. | |
| 2018/0227871 A1* | 8/2018 | Singh | H04W 48/18 |
| 2019/0159027 A1* | 5/2019 | Kuge | H04W 92/18 |
| 2019/0230584 A1 | 7/2019 | Lou et al. | |
| 2019/0357130 A1* | 11/2019 | Garcia Azorero | H04W 8/08 |
| 2020/0042677 A1 | 2/2020 | Zwanzger | |
| 2020/0127860 A1 | 4/2020 | Aschauer | |
| 2020/0169413 A1 | 5/2020 | Aschauer | |
| 2020/0333757 A1 | 10/2020 | Belhachemi | |
| 2020/0366463 A1 | 11/2020 | Falk | |
| 2021/0314775 A1 | 10/2021 | Falk et al. | |

FOREIGN PATENT DOCUMENTS

| | | |
|---|---|---|
| EP | 2870565 A1 | 5/2015 |
| EP | 2891102 A1 | 7/2015 |
| EP | 2891266 A1 | 7/2015 |
| EP | 2899714 A1 | 7/2015 |
| EP | 2605445 B1 | 9/2015 |
| EP | 2930610 A2 | 10/2015 |
| EP | 2961091 A1 | 12/2015 |
| EP | 2961093 A1 | 12/2015 |
| EP | 2976707 B1 | 2/2017 |
| EP | 2940620 B1 | 4/2017 |
| EP | 3028140 B1 | 8/2017 |
| EP | 2870565 31 | 9/2017 |
| EP | 3125492 B1 | 1/2018 |
| EP | 3358887 A1 | 8/2018 |
| EP | 3413530 A1 | 12/2018 |
| EP | 3425845 A1 | 1/2019 |
| EP | 3444997 A1 | 2/2019 |
| EP | 3468095 A1 | 4/2019 |
| EP | 3483769 A1 | 5/2019 |
| EP | 3486825 A1 | 5/2019 |
| EP | 3489775 A1 | 5/2019 |
| EP | 3490285 A1 | 5/2019 |
| EP | 3493091 A1 | 6/2019 |
| EP | 3502806 A1 | 6/2019 |
| EP | 3503493 A1 | 6/2019 |
| EP | 2981926 B1 | 7/2019 |
| EP | 3506143 A1 | 7/2019 |
| EP | 3506144 A1 | 7/2019 |
| EP | 3509004 A1 | 7/2019 |
| EP | 3509247 A1 | 7/2019 |
| EP | 3511858 A1 | 7/2019 |
| EP | 3514499 A1 | 7/2019 |
| EP | 3515033 A1 | 7/2019 |
| EP | 3518489 A1 | 7/2019 |
| EP | 3525085 A1 | 8/2019 |
| EP | 3525086 A1 | 8/2019 |
| EP | 3525126 A1 | 8/2019 |
| EP | 3525390 A1 | 8/2019 |
| EP | 3534282 A1 | 9/2019 |
| EP | 3541009 A1 | 9/2019 |
| EP | 3541038 A1 | 9/2019 |
| EP | 3557463 A1 | 10/2019 |
| EP | 3557837 A1 | 10/2019 |
| EP | 3561709 A1 | 10/2019 |
| EP | 3561713 A1 | 10/2019 |
| EP | 3562115 A1 | 10/2019 |
| EP | 3562116 A1 | 10/2019 |
| EP | 3585084 A1 | 12/2019 |
| FR | 2984069 A1 | 6/2013 |
| WO | 2017030713 A1 | 2/2017 |
| WO | 2017050348 A1 | 3/2017 |
| WO | 2018059494 A1 | 4/2018 |
| WO | 2018068965 A1 | 4/2018 |
| WO | 2018069271 A1 | 4/2018 |
| WO | 2018162107 A1 | 9/2018 |

OTHER PUBLICATIONS

Cambridge Dictionary, meaning of "when", printed on Jul. 18, 2023. (Year: 2023).*

Wang Jiahui et al.: "Extended platform authentication and access of trusted network", Computer Engineering andDesign, 2010,31, p. 239-248, DOI:10.16208/j.issn1000-7024.2010.02.036, Jan. 28, 2010, with English abstract.

* cited by examiner

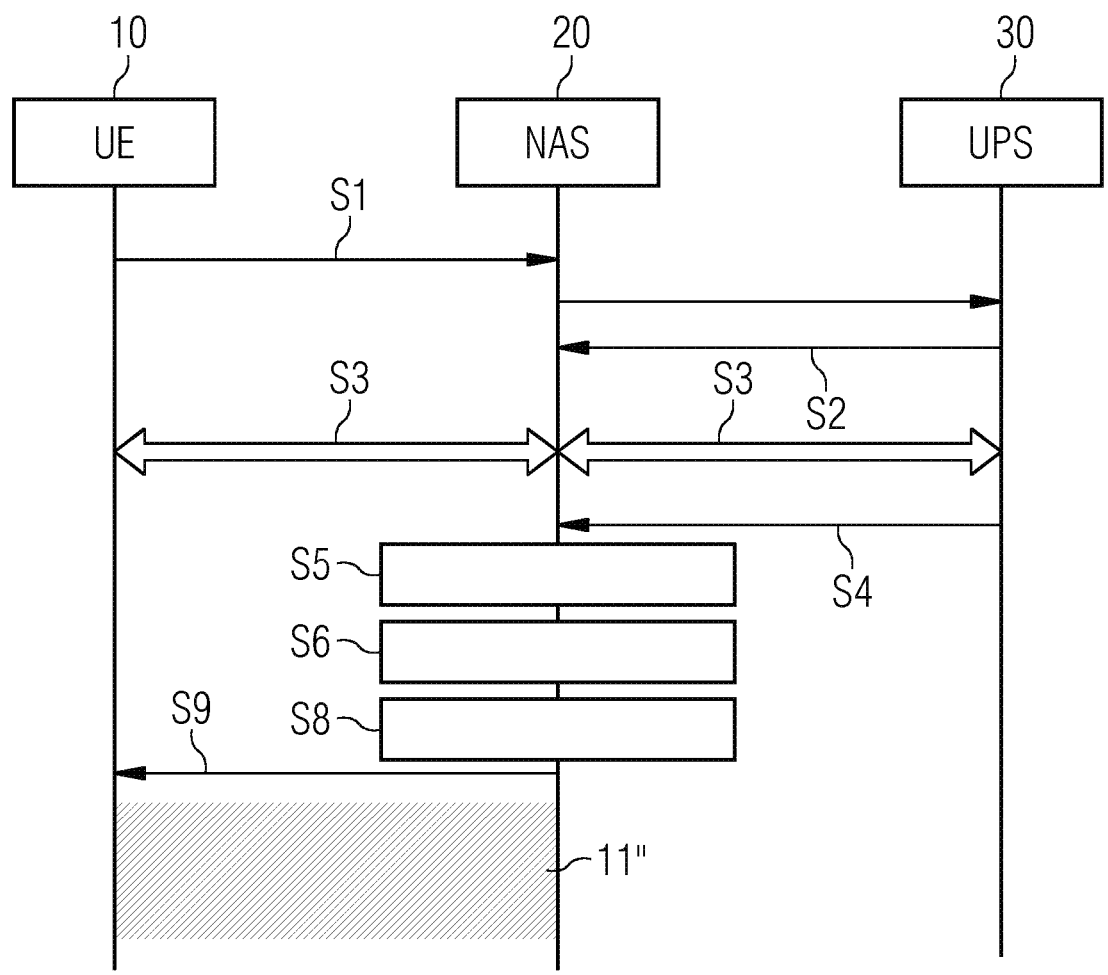

COMPUTER-IMPLEMENTED METHOD AND NETWORK ACCESS SERVER FOR CONNECTING A NETWORK COMPONENT TO A NETWORK WITH AN EXTENDED NETWORK ACCESS IDENTIFIER

This application is the National Stage of International Application No. PCT/EP2019/070858, filed Aug. 2, 2019, which claims the benefit of European Patent Application No. EP 18188314.1, filed Aug. 9, 2018, and European Patent Application No. EP 18188525.2, filed Aug. 10, 2018. The entire contents of these documents are hereby incorporated herein by reference.

BACKGROUND

The present embodiments relate to a computer-implemented method and to a network access server for connecting a network component to a network with an extended network access identifier.

In modern mobile networks, various network access identifiers (NAIs) are used when accessing a network in order to identify a subscriber and a corresponding network access server. The network access identifiers known from the prior art take the form of an email address (e.g., in the form "user@realm"). The network access identifier was originally developed for accessing a network via a modem and a telephone line, where a username and an associated password are input and checked. In the event of a correct input, a connection to the Internet or an intranet is achieved. In this form, the network access identifier is nothing more than a username that was constructed from two parts (e.g., a first part consisting of the user part that is separated from the second part, such as the provider name, by an @ sign). This has the purpose that a plurality of providers are able to jointly use an identical structure of the identifier to access a network.

The once simple network access method is nowadays used in a far more complex form and in increasingly more complex networks (e.g., in mobile communications). By way of example, differently formed network access identifiers such as "Permanent User Identifier", "Pseudonym User Identifier" or "Equipment Identifier" are used in mobile networks.

In this case, it has become known that it is possible to code specific information (e.g., information about the type of network access, about the type of network (such that WLAN access is for example made possible) and one's own subscriber number (International Mobile Subscriber Identity—IMSI), which is in principle the same as the telephone number) into the network access identifier.

The mobile network code (MNC) and the mobile country code (MCC) may also be coded into the "realm" of the network access identifier. Using MNC coding and MCC coding makes it possible to identify the mobile operator of a subscriber. As a result of this, it is possible to distinguish between the mobile operators. The various forms of registration on a foreign network without taking into account the infrastructure are provided by the Extensible Authentication Protocol (EAP).

A first example of a network access identifier is:
"wlan.mnc01.mcc262.3gppnetwork.org"
In this first example, "WLAN" codes the type of access used by the user (e.g., via the WLAN).
"MNC01" indicates the provider, here for example Telekom AG.
"MCC262" indicates the country identifier (e.g., Germany).
"3gppnetwork.org" describes the standard in accordance with which the network access identifier is created. As a result of this, this network identifier is able to be assigned uniquely to 3gpp.org, and collisions with other network identifiers are avoided.

A second example of a network access identifier is:
Pseudocode:

"0<IMSI>@wlan.mnc<MNC>.mcc<MCC>.3gppnetwork.org"

Example

0234150999999999@wlan.mnc01.mcc262.3gppnetwork.org

In this example, the placeholder "<IMSI>" describes an identifier that is uniquely assigned to a mobile subscriber (e.g., subscriber identifier) and that is stored on a SIM card. This identifier allows the user to be identified uniquely after registering on the mobile network.

In the event of a SIM card not being inserted, a unique subscriber identifier is not available, where in this case, the device number of the mobile telephone "<IMEI>" may be used instead of the subscriber identifier.

A third example of a network access identifier is:
Pseudocode:

"wlan.mnc<homeMNC>.mcc<MCC>.3gppnetwork.org
!0<IMSI>@wlan.mnc<visitedMNC>.mcc<visitedMCC>.3gppnetwork.org"

Example wlan.mnc01.mcc262.3gppnetwork.org
!0234150999999999 @ wlan.mnc071.mcc610.3gppnetwork.org In this example, the placeholder "<homeMNC>" describes an identifier that describes the contract partner with which the mobile contract was concluded and for which the SIM card was issued. The placeholder "<visitedMNC>" describes the mobile operator on whose network a user has registered. This is the case, for example, when a mobile subscriber uses a SIM card of a German provider to register on a mobile network abroad.

The abovementioned examples serve as an exemplary explanation and illustration of the structure of a network access identifier, and do not constitute any restriction thereof for the present invention.

Future mobile networks (e.g., the 5G network) support far greater flexibility in terms of different usage scenarios than mobile networks that are currently used.

There is provision also to use the 5G network for critical and/or industrial devices and control systems. Critical devices may be, for example, robot systems and corresponding controllers having special security requirements and/or real-time requirements or factory and manufacturing automation systems having special security and real-time requirements. Special requirements are additionally placed on patching the devices in the industrial environment. In many of the devices used in the industrial environment, it may be assumed that the software used by these devices is not configured to be patched or that the software is not patched. In this regard, the problem arises that devices having an out-of-date software version and known vulnerabilities may be connected to the public network (e.g., the Internet) via the 5G network (e.g., even though these devices, on account of the vulnerabilities, are not suitable for this, and the risk thus arises of external manipulation by unauthorized third parties via the public network).

The term "patching" may be the repair or improvement of an out-of-date software version in which a new software version is installed, in order, for example, to overcome identified problems or vulnerabilities. Patching in this case does not require complete reinstallation of the software, but rather, may also include an additional software installation. It is, however, also possible to update firmware of a device in order to overcome vulnerabilities.

Unperformed patching of software in the case of devices in the industrial environment may be attributed to various reasons, specifically to operational reasons. A software change/software update on a device, for example, requires a maintenance window in order not to interfere with or to interrupt the operation of an installation in the industrial environment by installing and testing new software.

In addition, specifically in the case of device software having security authorization, after new software has been installed, there is a need for requalification and an authorization process to use the device with the new device software. This may lead to increased cost and time outlay. In this regard, in the case of devices in the industrial environment, updating and thus patching of the device software is very widely dispensed with. This increases the risks of manipulation of the devices via known vulnerabilities when connecting to a public network via the 5G network.

In order for it to be provided that devices that have real-time or security properties and additionally have vulnerabilities are not exposed to manipulation or destruction by being accessed by third parties via a public network when such devices connect to a 5G network in the industrial environment, the connectivity to the 5G network is to be controlled with high reliability.

Known solutions in this regard provide restricted access authorization to the user profiles stored on the user profile server. This is, however, susceptible to errors and linked with high expenditure since the changes in the access authorization are to be performed by the network operator in a manner specific to the network components (e.g., separately for each network component).

CA 3019903 A1 relates to a communication method for transmitting and receiving data for network slicing and DeCOR. Based on a request from a terminal or registration information from a terminal, the terminal performs a connection process to one or more network slices in accordance with a service or an application.

WO 2018121880 A1 relates to the selection of a network slice in a telecommunications network for use by a user terminal.

SUMMARY AND DESCRIPTION

The scope of the present invention is defined solely by the appended claims and is not affected to any degree by the statements within this summary.

There is therefore a need for a computer-implemented method for connecting a network component to a network (e.g., a mobile network) with an extended network access identifier.

There is also a need for a network access server for connecting a network component to a network (e.g., a mobile network) with an extended network access identifier.

The present embodiments provide a computer-implemented method for connecting a network component to a network (e.g., a mobile network) with an extended network access identifier, and a network access server.

The present embodiments accordingly provide a computer-implemented method for connecting a network component to a network (e.g., a mobile network) with an extended network access identifier. The method includes receiving the extended network access identifier from the network component via a network access server, where the extended network access identifier includes at least one network access restriction for connecting the network component to the network. The method also includes receiving a requested user access profile from a user profile server via the network access server, where the user access profile includes access authorizations for connecting the network component to the network.

The computer-implemented method also includes authenticating the network component in the network via the network access server if the received extended network access identifier meets the access authorizations of the received user access profile. The method also includes configuring the network connection of the network component to the network via the network access server, using the access authorizations of the user access profile, as soon as the network component is authenticated. The method also includes determining the network access restriction received with the extended network access identifier via the network access server. The method also includes verifying the configured network connection of the network component to the network via the network access server based on the determined network access restriction. The method also includes connecting the network component to the network via the network access server as soon as the configured network connection is verified and the configured network connection meets the determined network access restrictions. It is possible for an extended network access identifier to include a single one or a multiplicity of network access restrictions.

In this case, network components include devices (e.g., computers, servers, devices having a microcontroller and a memory, devices in the industrial environment, such as automation and control technology and robots and industrial IoT devices (IoT: Internet of Things) that are connected to the network). This exemplary list does not constitute an exhaustive list in itself. By contrast, many further devices that are not mentioned, that are used in an industrial application and that are able to be connected to a network via a modem and/or a network card and/or a communication module, may be added to the exemplary list.

A network may, in this case, be a system that consists of a number of elements, and the respective elements are connected to one another via interconnections. The network is, for example, a mobile network in accordance with 5G standard.

An extended network access identifier may be a network identifier that includes a network access restriction.

An access authorization may be the network usage parameters agreed between a network subscriber and the network operator. These may include, for example, a priority access right to the network and certain quality of service (QoS) parameters, such as, for example, bandwidth, data volumes, etc.

A user profile server may be a server that is, for example, a computer connected to the network (e.g., an AAA (Authentication Authorization Accounting) server, an HSS (Home Subscriber Server) server or a UPS (User Profile Server) server on which the user profile of the network subscriber is stored).

According to a further aspect, the present embodiments also provide a network access server for configuring a network connection for connecting a network component to a network (e.g., a mobile network) with an extended network access identifier. The network access server includes at least one interface that is configured to receive the extended network access identifier from a network component and to receive a user access profile from an access profile server. The extended network access identifier includes at least one network access restriction for connecting the network component to the network. The network access profile includes access authorizations for connecting the network component to the network.

The network access server also includes at least one processor unit that is configured to authenticate the network component in the network if the received extended network access identifier meets the access authorizations of the received user access profile. The at least one processor unit is also configured to configure the network connection of the network component to the network using the access authorization of the user access profile as soon as the network component is authenticated, and to determine the network access restriction received with the extended network access identifier. The at least one processor unit is configured to verify the configured network connection of the network component to the network based on the determined network access restriction, and to connect the network component to the network as soon as the configured network connection is verified.

According to a further aspect of the present embodiments, the use of a network access server according to the present embodiments is also provided. This is suitable, for example, for performing a method according to the present embodiments for connecting a network component to a network.

According to a further aspect of the present embodiments, a computer program product containing program code stored on a machine-readable carrier is provided for performing a method according to the present embodiments.

The present embodiments are based on the finding that, using an extended network access identifier, a network component is able to request properties from a network or network access restrictions.

In conventional networks, one aim is for the network component to be connected to a network to receive the best possible access to the network. In this regard, the access authorization and parameters (e.g., priority and QoS parameters) may be stored in the user access profile on the user profile server.

In one embodiment, a correspondingly coded network access identifier and the processing thereof by a network access server may be used to signal to the network access server that the network component may be connected to the network only via certain access. The network component may therefore not be connected to the network via the best possible access, but rather, the network component explicitly provides, via the network access server, that only network access that is restricted in accordance with the requests, where applicable, is set up.

This is, for example, in Industry 4.0 scenarios in which a network component may be connected only to a virtual local control network, but not to a public network (e.g., the Internet). This is necessary specifically in the case of devices on which patches are not able to be installed in a timely manner. It is to be very reliably provided, for example, that such a network component is able to connect only to a subnetwork that is also provided for this network component.

In one embodiment, during the authentication process, a network component may itself signal to the mobile network that the network component wishes to use only restricted network access. It is thereby possible to fixedly predefine or to provide, through a suitable network component configuration, that a network component is not "inadvertently" connected to an unsuitable network.

By virtue of the present embodiments, the network connection policy may not be defined by the network operator, but rather, by contrast, a network component connects to the network only when the network access restriction requested in the network access identifier is met by the network operator.

It is also possible for network components to be able to restrict access to a network for itself by virtue of the extended network access identifier including a network access restriction. The network operator may provide network access to a network with defined parameters, where the network component may restrict its access in order thereby to meet the security requirements.

According to one embodiment, the method includes configuring a restricted network connection of the network component to the network via the network access server using the access authorizations of the user access profile and the network access restriction of the received extended network access identifier.

The method also includes connecting the network component to the network via the network access server as soon as the restricted network connection of the network component to the network is configured by the network access server.

A restricted network connection of the network component to the network is thus able to be configured when the existing network connection, following authentication to the network, does not meet the requested network access restriction and thus the requested restriction. If not, setup of a network connection is blocked, and the requirement of not connecting a network component to a network that does not include the network access restriction is met.

According to one embodiment, the network access restriction includes an identification feature for the connection of the network component to a network slice in the network.

A network slice may be a virtual logic network that is implemented based on an existing identical network infrastructure. In one embodiment, it is not necessary to physically set up any different networks for a real-time capable network and/or for a network with a high data throughput, but rather, by contrast, a common infrastructure (e.g., a 5G network infrastructure) is used. In this common 5G network infrastructure, it is possible to define logic network slices, using which, it is possible to set up a network connection to a network component.

According to one embodiment, the network slice has an operating state.

The logic network slices may have an operating state. By way of example, a network slice may include as operating state for real-time control in an industrial security environment or specifically defined operating states in which a certain quality of service from the network point of view (e.g., data throughput, delay, jitter, processing, etc.) is provided.

According to one embodiment, the network access restriction includes an identification feature for connecting the network component to a subnetwork of the network slice in the network.

A network slice may have a two-stage structure, such that a network slice is able to be divided into further subnetworks. This has the advantage that the number of network slices supported by the network operator does not become arbitrarily great. As soon as a particular specialization is necessary, a region for the specialization may be reserved logically from an existing network slice. This reduces the number of network slices and allows easier and faster management of these network slices.

According to one embodiment, the network access restriction incudes an identification feature for connecting the network component to a network zone in the network.

A network zone may be a structured assignment of network components that are located in a common spatial region, or, for example, have a common requirement for real time or monitoring. From a planning and security point of view as well, various network components are assigned to a common network zone and connected to a common network in a manner separated from one another, for example, by a firewall.

In a 5G network, the network zone assignment is implemented logically in order to be able to assign wirelessly connected network components to a network zone. A network connection to a network component in a network may thereby be set up only with a device in its own network zone, but not with other devices.

According to one embodiment, the network access restriction includes an operating state of a network slice or of a subnetwork of the network slice.

In one embodiment, in practice, network slices may include a network slice with at least one subnetwork (e.g., for a real-time requirement, for a monitoring requirement, or for a security requirement). In addition, it may also be coded into the logic network slice assignment that the network connection is provided, for example, for a real-time requirement or security requirement. Before a network connection is set up, there is a check on the network slice to be connected as to whether this contains a marker (e.g., a label for a real-time requirement). If there is a corresponding match between the requested and the supplied label, a network connection is set up. Otherwise, the network connection is blocked.

In one embodiment, the operating state may be able to represent an item of purpose information that is specified, for example, via a character string containing a bit string or a label. During the verification, it is checked whether, for example, the assignment of a label to the network slice, by way of which a network connection is intended to be established, is reliable and/or compatible. The advantage achieved in this case is that a network connection is granted or configured only when the assignment is reliable and/or compatible.

According to one embodiment, the network access restriction includes cryptographic protection.

Cryptographic protection may be a cryptographic algorithm that includes a "Cipher Suite Option". A "Cipher Suite Option" includes a basic algorithm, such as, for example, AES128 that is divided into various operating types/usage types (GCM—Galois Counter Mode, CMAC—Cipher-based Message Authentication Code) that always use the same basic algorithm. "Cipher Suite" denotes, for example, the security protocol and the variant of the selected cryptographic protection.

The cryptographic protection of network connections in a network is configured by the network operator. The advantage achieved using the network access restriction in terms of cryptographic protection is that, in the event that the protection variants provided by the network operator may not correspond to the requirements of the critical requirements of the devices in an industrial environment, a network connection is not set up between the devices and the network.

According to one embodiment, the network access identifier is a two-stage network access identifier.

According to one embodiment, the two-stage network access identifier includes a network access restriction in a first stage and a further network access restriction in a second stage.

In one embodiment, two different network access restrictions may be used for the network access identifier. The two different network access restrictions are placed next to one another and include a network access restriction in a first stage (e.g., outer network access identifier) and a network restriction in a second stage (e.g., inner network access identifier), and thus, two separate items of information (restrictions). The advantage achieved is that, when using two-stage network access identifiers, the restriction coded by the outer stage and the restriction coded by the inner stage are able to be checked for a match. In the absence of a match, a network connection is not set up.

In a further embodiment, effective network access restrictions are determined as a logic combination of the restriction of the outer network access identifier and of the inner network access identifier. This offers the advantage that a network connection has to meet both the restrictions that are coded by the outer network access identifier and the restrictions that are coded by the inner network access identifier. If one of the two restrictions is not met, a network connection is not set up, regardless of the knowledge as to whether a restriction specified in the inner or outer network access identifier is not met.

The processor unit is may be configured to configure a restricted network connection of the network component to the network using the access authorizations of the user access profile and the network access restriction of the received extended network access identifier, and to connect the network component to the network as soon as the restricted network connection of the network component to the network is configured.

The advantage achieved in this case is that the configured network connection meets the network access restriction of the network access identifier, and a network connection in accordance with the requirements of the network component in terms for example of real time or security is thus provided.

The present embodiments are explained in more detail below with reference to the exemplary embodiments given in the schematic figures of the drawings. These examples also encompass variations or additions as become immediately apparent to those skilled in the art. These exemplary embodiments do not constitute any restrictions to the invention in the respect that variations and additions are within the scope of the present invention.

BRIEF DESCRIPTION OF THE DRAWINGS

FIG. 7 shows a schematic illustration of a time sequence of a setup of a network connection according to one embodiment.

DETAILED DESCRIPTION

Figure 1:
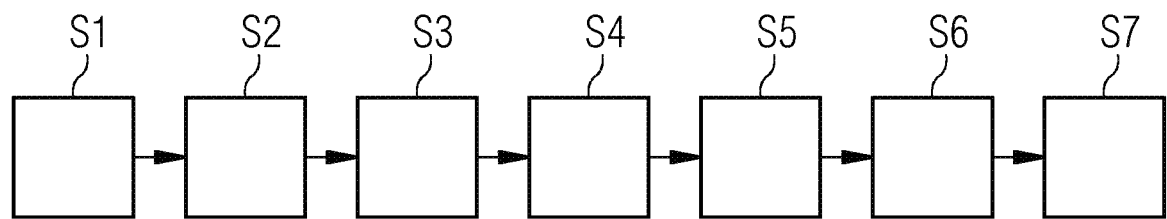
FIG. 1 shows a schematic illustration of a computer-implemented method for connecting a network component to a network using an extended network access identifier according to one embodiment.

FIG. 1 shows a schematic illustration of one embodiment of a computer-implemented method for connecting a network component 10 to a network N (e.g., to a mobile network), where an extended network access identifier according to one embodiment is used. The network component 10 includes devices (e.g., computers, hand-held terminals, servers, devices having a microcontroller and a memory, and devices in the industrial environment, including automation and control technology, robots and industrial IoT devices (IoT: Internet of Things) that are able to be connected to a network via a modem and/or a network card and/or a communication module). The network identifier of the network component 10 also includes a network access restriction in order to request properties or restrictions of the network connection.

In a first act S1, an extended network access identifier of a network component 10 is received by a network access server 20. The extended network access identifier includes at least one network access restriction for connecting the network component 10 to the network N.

In a further act S2, a requested user access profile is received from a user profile server 30 by the network access server 20, where the user access profile includes access authorizations for connecting the network component 10 to the network N.

In a following act S3, the network component 10 in the network N is authenticated by the network access server 20 if the received extended network access identifier meets the access authorizations of the received user access profile.

In a further act S4, the network connection 11' of the network component 10 to the network N is configured by the network access server 20, using the access authorizations of the user access profile, as soon as the network component 10 is authenticated.

In a following act S5, the at least one network access restriction received with the extended network access identifier is determined by the network access server 20.

In a further act S6, the configured network connection 11' of the network component 10 to the network N is verified by the network access server 20 based on the network access restriction determined in act S5.

In a further act S7, the network component 10 is connected to the network N by the network access server 20 as soon as the configured network connection 11' is verified in act S6 and the configured network connection 11' meets the determined network access restrictions.

In the method, it is checked whether the user access profile received from the user profile server 30 meets the network access restriction received with the extended network access identifier. The user access profile describes the type of network connection to the network N and the restrictions of the network connection configured by the network operator. To this end, a network connection 11' is configured and verified based on the user access profile received from the user profile server 30. If the configured network connection 11' meets the network access restriction signaled by the network component 10 and determined by the network access server 20, the network component 10 is connected to the network N via the configured network connection 11'. The configured network connection meets the network access restriction signaled by the network access identifier and corresponds to the requirements, set by the network component 10, in terms of a restricted network connection.

If the configured network connection does not meet the network access restriction determined by the network access server 20, the network component 10 is not connected to the network N via the configured network connection 11'.

In a further embodiment, in a further act S8 (FIG. 7), a restricted network connection 11" of the network component 10 to the network N is configured by the network access server 20 using the access authorizations of the user access profile and the network access restriction of the received extended network access identifier.

The network connection 11' configured based on the user access profile received from the user profile server 30 is configured in accordance with the network access restriction signaled with the network access identifier and further restricted with the restriction requested by the network component 10.

In a further act S9 (FIG. 7), the network component 10 is connected to the network N by the network access server 20 as soon as the restricted network connection 11" of the network component 10 to the network N is configured by the network access server 20.

Figure 2:
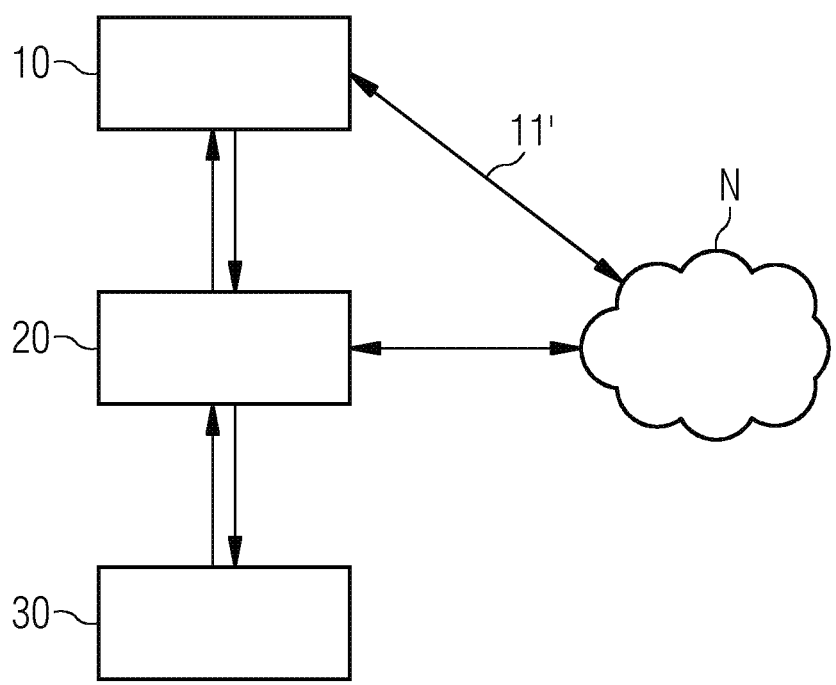
FIG. 2 shows a schematic illustration of a network connection in a network with a configured network connection according to one embodiment.

The network access server 20 illustrated in FIG. 2 is connected to a network component 10 and a user profile server 30. The network access server 20 is connected to the network N. If the configured network connection 11' meets the network access restriction determined by the network access server 20, the network component 10 is connected to the network N via the configured network connection 11', and if not, the network component 10 is not connected to the network N. The network component 10 may, for example, be connected to the network N via a network access node.

Figure 3:
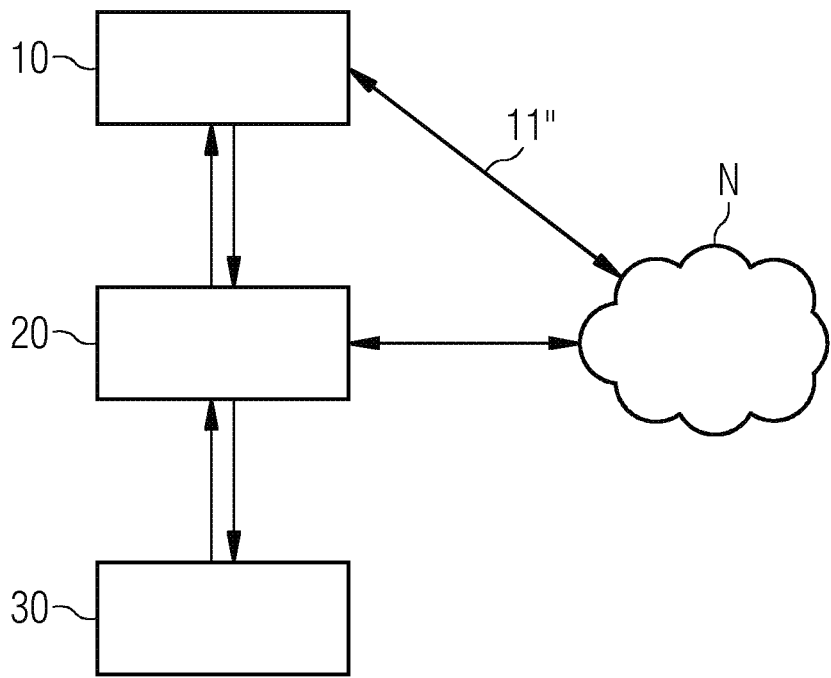
FIG. 3 shows a schematic illustration of a network connection in a network with a configured network connection according to one embodiment.

The network access server 20 illustrated in FIG. 3 is connected to a network component 10 and a user profile server 30. The network access server 20 is connected to the network N. If the configured network connection 11' in FIG. 2 does not meet the network access restriction determined by the network access server 20, in a further embodiment of the present embodiments, a restricted network connection 11" may be configured by the network access server 20. The restricted network connection 11" meets the network access restriction requested by the network component 10. As a result of this, the network component 10 is connected to the network N. The network component 10 may, for example, be connected to the network N via a network access node.

Figure 4:
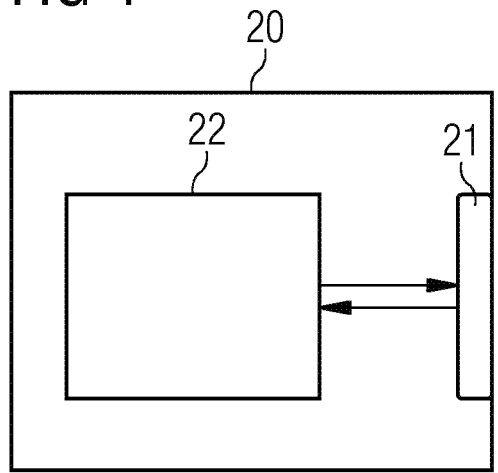
FIG. 4 shows a schematic illustration of a network access server for connecting a network component to a network using an extended network access identifier according to one embodiment.

FIG. 4 illustrates a network access server 20 having an interface 21 and a processor unit 22. The processor unit 22 is connected at input and at output to the interface 21. Data is exchanged (e.g., the extended network access identifier is received from the network component 10) via the interface 21. The extended network access identifier has at least one network access restriction for connecting the network component 10 to the network N. The data exchange also includes receiving a requested user access profile from a user profile server 30. The user access profile contains access authorizations for connecting the network component 10 to the network N. The processor unit 22 is configured to authenticate the network component 10 in the network N if the received extended network access identifier meets the access authorizations of the received user access profile. The processor unit 22 is also configured to configure the network connection of the network component 10 to the network N using the access authorization of the user access profile as soon as the network component 10 is authenticated. The at least one network access restriction received with the extended network access identifier may also be determined. The configured network connection 11' of the network component 10 to the network N may also be verified based on the determined network access restriction, and the network component 10 may be connected to the network N as soon as the configured network connection 11' is verified.

In a further embodiment, the processor unit 22 is also configured to configure a restricted network connection 11" of the network component 10 to the network N using the access authorizations of the user access profile and the network access restriction of the received extended network access identifier. The processor unit 22 is also configured to connect the network component 10 to the network N as soon as the restricted network connection of the network component 10 to the network N is configured.

Figure 5:
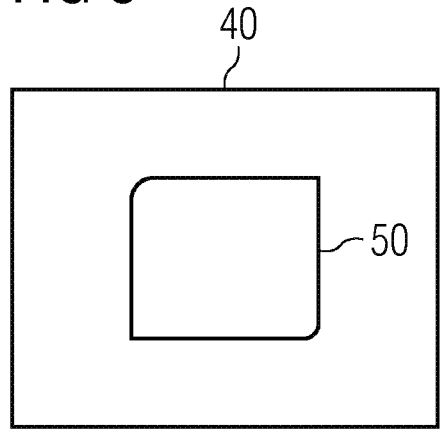
FIG. 5 shows a schematic illustration of a computer-readable storage medium including executable program code according to one embodiment.

FIG. 5 illustrates a computer-readable storage medium 40. The storage medium 40 includes an executable program code 50 that is configured to perform the method according to the present embodiments when the executable program code 50 is executed. When the program code 50 is executed, a network connection 11" is set up, via which the network component 10 is connected to a network N (e.g., a mobile network).

Figure 6:
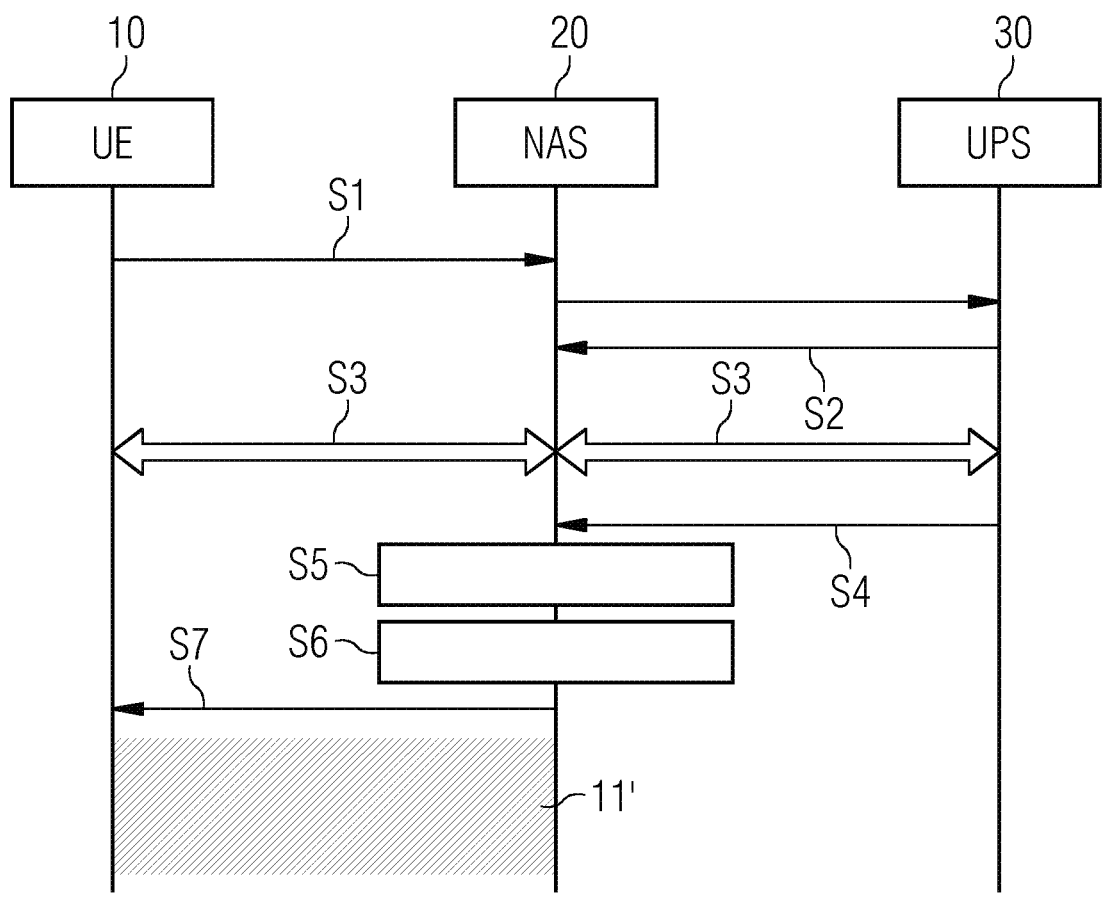
FIG. 6 shows a schematic illustration of a time sequence of a setup of a network connection according to one embodiment.

FIG. 6 shows the sequence of one embodiment of the computer-implemented method for connecting a network component 10 to a network N (e.g., a mobile network) using an extended network access identifier.

In a first act S1, a network access server 20 (e.g., a Network Access Server (NAS)) receives, from a network component 10 (e.g., a user device (User Equipment UE)), an extended network access identifier including a network access restriction. In a second act S2, the network access server 20 requests/receives the user access profile of a network component 10 from a user profile server 30 (e.g., a User Profile Server (UPS)). In a further act S3, the network component 10 is authenticated and, after successful authentication, a network connection 11' is configured based on the user access profile received from the user profile server 30 in act S4. In act S5, the network access restriction received with the network access identifier is determined, and then, in act S6, the configured network connection 11' is verified based on the determined network access restriction.

If the configured network connection 11' meets the network access restriction signaled by the network component 10 and determined by the network access server 20, the network component 10 is connected to the network N via the configured network connection 11'.

The configured network connection 11' meets the network access restriction signaled by the network access identifier and corresponds to the requirements, set by the network component 10, in terms of a restricted network connection.

The network access restriction, coded in the network access identifier, of a network component 10 may be fixedly predefined on the network component 10 itself (e.g., in the firmware of the network component 10). This is advantageous for security-critical network components 10, since the firmware is also not able to be configured inadvertently for open communication or an unrestricted network connection. The firmware may be configurable (e.g., may be stored in a configuration memory or a configuration memory area of the network component). The firmware may likewise be stored on a configuration storage module (e.g., C-plug) or on a subscriber authentication module (e.g., 5G SIM).

FIG. 7 shows the sequence of a further embodiment of the computer-implemented method for connecting a network component 10 to a network N (e.g., a mobile network) using an extended network access identifier.

In a first act S1, a network access server 20 (NAS) receives, from a network component 10 (UE), an extended network access identifier including a network access restriction. In a second act S2, the network access server 20 requests/receives the user access profile of a network component 10 from a user profile server 30 (UPS). In act S3, the network component 10 is authenticated and, after successful authentication, a network connection 11' is configured based on the user access profile received from the user profile server 30 in act S4. In act S5, the network access restriction received with the network access identifier is determined, and then, in act S6, the configured network connection 11' is verified based on the determined network access restriction.

If the configured network connection 11' meets the network access restriction signaled by the network component 10 and determined by the network access server 20, the network component 10 is connected to the network N via the configured network connection 11' (FIG. 6). The configured network connection 11' meets the network access restriction signaled by the network access identifier and corresponds to the requirements, set by the network component 10, in terms of a restricted network connection.

If the configured network connection 11' does not meet the network access restriction determined by the network access server 20, the network component 10 is not connected to the network N via the configured network connection 11'.

In a further act S8, a restricted network connection 11" of the network component 10 to the network N is configured by the network access server 20 using the access authorizations of the user access profile and the network access restriction of the received extended network access identifier. Then, in act S9, the network component 10 is connected to the network N via a restricted network connection 11" in accordance with the network access restriction received with the extended network access identifier. The network component 10 receives network access 11" in accordance with the network access restriction requested by the network component 10, even if the user access profile received from the user profile server 30 permits further connection or communication options with the network N.

Two examples of the coding of a network access restriction requested by a network component 10 are given below.

A first example of a network access identifier with the requested network access restriction is:
Pseudocode:

---

"1<IMSI>@<restriction>.<campus>.mnc<MNC>.mcc<MCC>.3gppnetwork.org"

---

Example

1234150999999999@norouting!safety.campusSiemens.mnc01.mcc2 62.3gppnetwork.org

In this first example, the placeholder "<IMSI>" describes an identifier that is uniquely assigned to a mobile subscriber (e.g., subscriber identifier) and is stored on a SIM card. This identifier allows the user to be identified uniquely after registering on the mobile network.

This example specifies a network component 10 that is intended to be connected only to a subnetwork (e.g., a campus network) that is not routed (e.g., is connected to other subnetworks) and is intended for a security controller communication.

A second example of a network access identifier with the requested network access restriction is:
Pseudocode:

```
"slice@<sliceID>.3gppnetwork.org
!6<IMSI>@campus<campusID>.mnc<MNC>.mcc<MCC>.3
gppnetwork.org"
```

Example

Slice3AEA602D.mnc01.mcc262.3gppnetwork.
org!023415099999999
9@campusSiemens.mnc071.mcc610.3gppnetwork.org In this example, it is coded that a connection may be established only with a certain network slice (e.g., specified by a hexadecimally coded 32-bit value 3AEA602D) and a specific campus network (e.g., campus network Siemens).

In summary, the present embodiments relate to a computer-implemented method for connecting a network component to a network (e.g., a mobile network) with an extended network access identifier. In this case, the extended network access identifier is received from the network component by a network access server, where the extended network access identifier includes at least one network access restriction for connecting the network component to the network. A requested user access profile is received from a user profile server by the network access server, where the user access profile includes access authorizations for connecting the network component to the network. The network component in the network is authenticated by the network access server if the received extended network access identifier meets the access authorizations of the received user access profile. The network connection of the network component to the network is also configured by the network access server, using the access authorizations of the user access profile, as soon as the network component is authenticated. The at least one network access restriction received with the extended network access identifier is determined by the network access server, and the configured network connection of the network component to the network is verified by the network access server based on the determined network access restriction. The network component is then connected to the network by the network access server as soon as the configured network connection is verified and the configured network connection meets the determined network access restrictions.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for connecting a network component to a mobile network, with an extended network access identifier, the computer-implemented method comprising:
   receiving the extended network access identifier from the network component via a network access server, wherein the extended network access identifier comprises at least one network access restriction for connecting the network component to the mobile network;
   receiving a requested user access profile from a user profile server via the network access server, wherein the user access profile comprises access authorizations for connecting the network component to the mobile network;
   authenticating the network component in the mobile network via the network access server when the received extended network access identifier meets the access authorizations of the received user access profile;
   configuring the network connection of the network component to the mobile network via the network access server, using the access authorizations of the user access profile, as soon as the network component is authenticated;
   determining the network access restriction received with the extended network access identifier via the network access server;
   verifying the configured network connection of the network component to the mobile network via the network access server based on the determined network access restriction;
   connecting the network component to the mobile network via the network access server as soon as the configured network connection is verified and the configured network connection meets the determined network access restriction;
   configuring a restricted network connection of the network component to the mobile network via the network access server, using the access authorizations of the user access profile and the network access restriction of the received extended network access identifier; and
   connecting the network component to the mobile network via the network access server as soon as the restricted network connection of the network component to the mobile network is configured by the network access server.

2. The computer-implemented method of claim 1, wherein the network access restriction comprises an identification feature for connecting the network component to a network slice in the mobile network.

3. The computer-implemented method of claim 2, wherein the network slice has an operating state.

4. The computer-implemented method of claim 2, wherein the network access restriction comprises an identification feature for connecting the network component to a subnetwork of the network slice in the mobile network.

5. The computer-implemented method of claim 1, wherein the network access restriction comprises an identification feature for connecting the network component to a network zone in the mobile network.

6. The computer-implemented method of claim 2, wherein the network access restriction comprises an operating state of a network slice or of a subnetwork of the network slice.

7. The computer-implemented method of claim 1, wherein the network access restriction comprises cryptographic protection.

8. The computer-implemented method of claim 1, wherein the network access identifier is a two-stage network access identifier.

9. The computer-implemented method of claim 8, wherein the two-stage network access identifier comprises a network access restriction in a first stage and a further network access restriction in a second stage.

10. A network access server for configuring a network connection for connecting a network component to a mobile network, with an extended network access identifier, the network access server comprising:
at least one interface that is configured to:
receive the extended network access identifier from a network component; and
receive a user access profile from an access profile server, wherein the extended network access identifier comprises at least one network access restriction for connecting the network component to the mobile network, and wherein the user access profile comprises access authorizations for connecting the network component to the mobile network;
at least one processor unit that is configured to:
authenticate the network component in the mobile network when the received extended network access identifier meets the access authorizations of the received user access profile;
configure the network connection of the network component to the mobile network using the access authorization of the user access profile as soon as the network component is authenticated;
determine the at least one network access restriction received with the extended network access identifier;
verify the configured network connection of the network component to the mobile network based on the determined network access restriction;
connect the network component to the mobile network as soon as the configured network connection is verified;
configure a restricted network connection of the network component to the mobile network via the access authorizations of the user access profile and the network access restriction of the received extended network access identifier; and
connect the network component to the mobile network as soon as the restricted network connection of the network component to the mobile network is configured.

11. A non-transitory computer-readable storage medium that stores instructions executable by one or more processors to connect a network component to a mobile network, with an extended network access identifier, the instructions comprising:
receiving the extended network access identifier from the network component via a network access server, wherein the extended network access identifier comprises at least one network access restriction for connecting the network component to the mobile network;
receiving a requested user access profile from a user profile server via the network access server, wherein the user access profile comprises access authorizations for connecting the network component to the mobile network;
authenticating the network component in the mobile network via the network access server when the received extended network access identifier meets the access authorizations of the received user access profile;
configuring the network connection of the network component to the mobile network via the network access server, using the access authorizations of the user access profile, as soon as the network component is authenticated;
determining the network access restriction received with the extended network access identifier via the network access server;
verifying the configured network connection of the network component to the mobile network via the network access server based on the determined network access restriction;
connecting the network component to the mobile network via the network access server as soon as the configured network connection is verified and the configured network connection meets the determined network access restriction;
configuring a restricted network connection of the network component to the mobile network via the network access server, using the access authorizations of the user access profile and the network access restriction of the received extended network access identifier; and
connecting the network component to the mobile network via the network access server as soon as the restricted network connection of the network component to the mobile network is configured by the network access server.

12. The non-transitory computer-readable storage medium of claim 11, wherein the network access restriction comprises an identification feature for connecting the network component to a network slice in the mobile network.

13. The non-transitory computer-readable storage medium of claim 12, wherein the network slice has an operating state.

14. The non-transitory computer-readable storage medium of claim 12, wherein the network access restriction comprises an identification feature for connecting the network component to a subnetwork of the network slice in the mobile network.

15. The non-transitory computer-readable storage medium of claim 11, wherein the network access restriction comprises an identification feature for connecting the network component to a network zone in the mobile network.

16. The non-transitory computer-readable storage medium of claim 12, wherein the network access restriction comprises an operating state of a network slice or of a subnetwork of the network slice.

17. The non-transitory computer readable storage medium of claim 11, wherein the network access restriction comprises cryptographic protection.

18. The non-transitory computer-readable storage medium of claim 11, wherein the network access identifier is a two-stage network access identifier.

19. The non-transitory computer-readable storage medium of claim 18, wherein the two-stage network access identifier comprises a network access restriction in a first stage and a further network access restriction in a second stage.

\* \* \* \* \*